(12) United States Patent
Albat et al.

(10) Patent No.: US 8,040,560 B2
(45) Date of Patent: Oct. 18, 2011

(54) AUTOMATED COLOR ADJUSTMENT

(75) Inventors: Andreas M. Albat, Delta (CA); Kent M. Brothers, N. Vancouver District (CA); Jennifer L. Canonayon, Surrey (CA)

(73) Assignee: Eastman Kodak Company, Rochester, NY (US)

( * ) Notice: Subject to any disclaimer, the term of this patent is extended or adjusted under 35 U.S.C. 154(b) by 761 days.

(21) Appl. No.: 12/124,451

(22) Filed: May 21, 2008

(65) Prior Publication Data
US 2009/0290171 A1  Nov. 26, 2009

(51) Int. Cl.
H04N 1/60 (2006.01)
H04N 1/46 (2006.01)
G03F 3/08 (2006.01)
G06K 9/00 (2006.01)

(52) U.S. Cl. ......... 358/1.9; 358/504; 358/518; 358/520; 358/523; 382/162; 382/167

(58) Field of Classification Search .................. 358/504, 358/1.9, 518, 520, 523; 382/162, 167
See application file for complete search history.

(56) References Cited

U.S. PATENT DOCUMENTS 6,043,909 A * 3/2000 Holub ........................... 358/504
6,075,614 A 6/2000 Ohtsuka et al.
7,097,269 B2 * 8/2006 Collette et al. .................. 347/19
2003/0025925 A1 2/2003 Elsman et al.

FOREIGN PATENT DOCUMENTS

EP 1 596 576 A2 11/2005

OTHER PUBLICATIONS

G7 Proof to Print Process; Guidelines and Specifications, 2007 IdeAlliance, International Digital Enterprise Alliance, pp. 48-64.

* cited by examiner

*Primary Examiner* — Charlotte M Baker
(74) *Attorney, Agent, or Firm* — Nelson Adrian Blish

(57) ABSTRACT

A method for determining (250) a change required in a selected base point in an input colorant space of a digital-image rendering system to obtain from the digital-image rendering system a desired reference output color to within a predetermined color tolerance comprises determining the required change based on a local approximation of the colorant/color relationship at the selected base point. Gradient points are automatically generated (210) that are proximate or coincident with the selected base point and that are different from any other base point than the selected base point. A linear approximation to the colorant/color relationship at the selected base point is computed (240) from the gradient points and the measured (230) output colors at the gradient points as rendered (220) by the digital-image rendering system and. The required change is determined from the local gradient of the colorant/color relationship at the selected base point.

14 Claims, 2 Drawing Sheets

AUTOMATED COLOR ADJUSTMENT

FIELD OF THE INVENTION

The present invention relates to a proof printing adjustment system and method. In particular, the present invention relates to a system and method to adjust inkings to obtain desired output colors.

BACKGROUND OF THE INVENTION

It is common to provide a sample of an image to a customer for approval prior to printing a large number of copies of an image using a high volume output device such as a printing press. The sample image is known as a "proof." The proof is used to ensure that the consumer is satisfied with, among other things, a color of the image.

It is not, however, cost effective to print the proof using high volume output devices of the type used to print large quantities of the image. This is because it is expensive to set up high volume output devices to print the image. Accordingly, it has become a practice in the printing industry to use digital color printers to print proofs. Digital color printers render color prints of images that have been encoded in the form of digital data. This data includes code values indicating the colors to be printed in the image. When the color printer generates a printed output of an image, it is intended that the image recorded on the printed output will contain the exact colors called for by the code values in the digitally encoded data.

In practice, it has been found that colors printed by digital color printers do not always match colors printed by high volume output devices. One reason for this is that variations in ink, paper and printing conditions can cause the digital color printer to generate images with colors that do not match the colors produced by the high volume output device using the same values. Therefore, a proof printed by the digital color printer may not have colors that match the colors printed by the high volume output device.

Accordingly, digital color printers have been developed that can be color adjusted so that they can mimic the performance of high volume output devices. Such adjustable color printers are known in the industry as "proofers."

Color calibration adjustments are used to modify the operation of the proofer so that the proofer prints the colors called for in the code values of the images to be printed by the proofer. These adjustments are necessary to compensate for the variations in ink, paper, and printing conditions that can cause the colors printed by the proofer to vary from the colors called for in the code values.

To determine what color calibration adjustments must be made, it is necessary to determine how the proofer translates code values into colors on the printed image. This is done by instructing the proofer to print a calibration test image or so-called "color chart." The calibration test image includes a number of colorant-combination patches. Each colorant-combination patch contains the color printed by the proofer in response to a particular code value.

Typically, a manual stand-alone calibration device is used to measure the colors in the test image. The measured color of each colorant-combination patch is converted into a color code value and is compared against the original "color chart" code value associated with that patch. Thereafter, comparisons are used to determine what adjustments must be made to the proofer to cause the proofer to print the desired colors in response to the particular color code values.

Color management adjustments are used to modify the operation of the proofer so that the image printed by the proofer will have an appearance that matches the appearance of the same image as printed by the high volume output device. The first step in color management is to determine how the high volume output device converts color code values into printed colors. This is known as "characterization." The result of such a characterization process is a "color profile."

It is recognized that calibration adjustments are based upon objective measurements of the color and tone characteristics of test images printed by the proofer and high volume output device. The most accurate device for measuring color for calibration and confirmation purposes is a spectrophotometer. A spectrophotometer measures the reflectance and/or transmittance of an object at a number of wavelengths throughout the visible spectrum. More specifically, a spectrophotometer exposes a test image to a known light source and then analyzes the light that is reflected by the test image to determine the spectral intensity. A typical spectrophotometer is capable of measuring a group of pixels in an image. It includes an apparatus that measures the light that is reflected by a portion of an image at a number of wavelengths throughout the visible spectrum to obtain data that represents the true spectral content of the reflected light.

Currently most proofing systems that utilize wide format inkjet printers, employ calibration technologies to ensure that a given inkjet printer produces output colors that closely match defined goal colors. It is thereby ensured that a plurality of printers of the same type will reproduce the goal colors quite closely. Many commercial proofing calibration implementations use the common approach of calibrating at certain times, e.g. Monday mornings or upon failure. Some software packages offer automated execution based on scheduling. This approach has the fundamental disadvantage that color can drift or change significantly between calibrations. Furthermore, if an unrepresentative print is used as the input for calibration routine, it may result in skewing the color output to undesired values. This undesirable shift could only be identified by verifying the output of a calibrated printer against the goal colors.

In general inkjet printers do not produce perfect proof-to-proof color consistency. In addition to short term noisy behavior, slow drifting and step color shifts also occur due to environmental changes such as temperature or humidity, ink variations due to, for example lot variation, media changes due to, for example, lot-to-lot variability, and hardware changes such as printhead replacement.

The performance variation of inkjet printers is also typically not tracked. The absence of such data makes it difficult to establish routines for adjusting the printer, or the data sent to the printer, so as to render colors more consistently.

Furthermore the current calibration embodiments from software vendors still require ongoing manual interventions to perform and monitor the state of the printing system and identify when the calibration should be redone.

Recently an increasing number of wide-format inkjet printers offer built-in spectrophotometers, which provide sufficiently accurate color measurements to allow the printers to be used as proofing systems. Examples of such systems include the B2 printer from Dupont-Nemours, the Veris system from Kodak, and the Z2100 and Z3100 systems from Hewlett-Packard. These devices lend themselves to better automation and reduced user intervention. In addition, different vendors now offer software packages supporting calibration of the printer with the built-in spectrophotometer as well as verification of color output and support for the measurement of color profiling charts.

Despite all the advantageous technological developments described in the foregoing, the actual adjustment of printers at present in the market place to ensure that an inking provides a desired goal color is still based on a simple point by point comparison of rendered colors with goal colors. In the prior art, extensive color models, based on previously stored data or on data collected during the calibration process, have been used to predict adjustments needed to be made to give consistent color rendering on the proofer. Unfortunately the coarse sampling of the color space leads to inaccurate color adjustments as it does not adequately reflect actual local color behavior. Against this background there remains a clear need for a method to automatically and accurately calibrate a proofing printer which allows for more rapid local variation in the color space.

SUMMARY OF THE INVENTION

Briefly, in one aspect the invention comprises a method for adjusting a digital-image colorant combination comprising a plurality of colorants such that the adjusted digital-image colorant combination will produce a reference output color to within a predetermined tolerance. The method of the invention comprises rendering, at each of a plurality of M base points in input colorant space, an output of the corresponding output color, M being an integer. Further, for each of the M base points, there are rendered at each of P automatically generated gradient points in input colorant space an output of the corresponding P gradient point output colors, the gradient points being both proximate the particular base point and different from any of the other M−1 base points, P being an integer. The output colors are measured in independent output color space at each of the M base points and at each of the gradient points. For each of the M base points, the differences in color associated with the differences in the digital-image colorant combinations between the base point and other proximate points (including but not limited to the gradient points) is used to derive a linear approximation of the change of color with respect to change in colorants. That is, in the vicinity of the base point the rates of change (partial derivatives) of each color component with respect to the colorants is approximately constant and can be represented by a constant gradient vector, which for the purpose of this description is taken to be a column vector. The set of gradient vectors can therefore be represented as a matrix G, with one column vector per color component, and the change in color $\Delta c$ (a row vector) relative to the color of the base point is related to the change in colorants $\Delta x$ (a row vector) approximately by the relation $\Delta c = \Delta x\, G$, where the right hand side of the equation indicates a matrix multiplication. This equation describes a linear system and the elements of G may be estimated from the base and proximate digital-image colorant combinations and their associated colors using standard methods for fitting linear systems.

For each base point, once a local estimate of the gradient matrix G is determined, the difference $\Delta c'$ between the color of the base point and the reference output color is computed, and the method then finds a change in colorants $\Delta x'$ such that $\Delta c' = \Delta x'\, G$. This amounts to solving a linear system of equations for $\Delta x'$. In general this system may be either underdetermined or overdetermined and the colorants must be non-negative and not exceed 100%, but standard techniques for addressing such conditions apply, as is described further in the preferred embodiment presented below.

The invention and its objects and advantages will become more apparent in the detailed description of the preferred embodiment presented below.

BRIEF DESCRIPTION OF THE DRAWINGS

The present invention will be more readily understood from the detailed description of exemplary embodiments presented below considered in conjunction with the attached drawing.

DETAILED DESCRIPTION OF THE INVENTION

Figure 1:
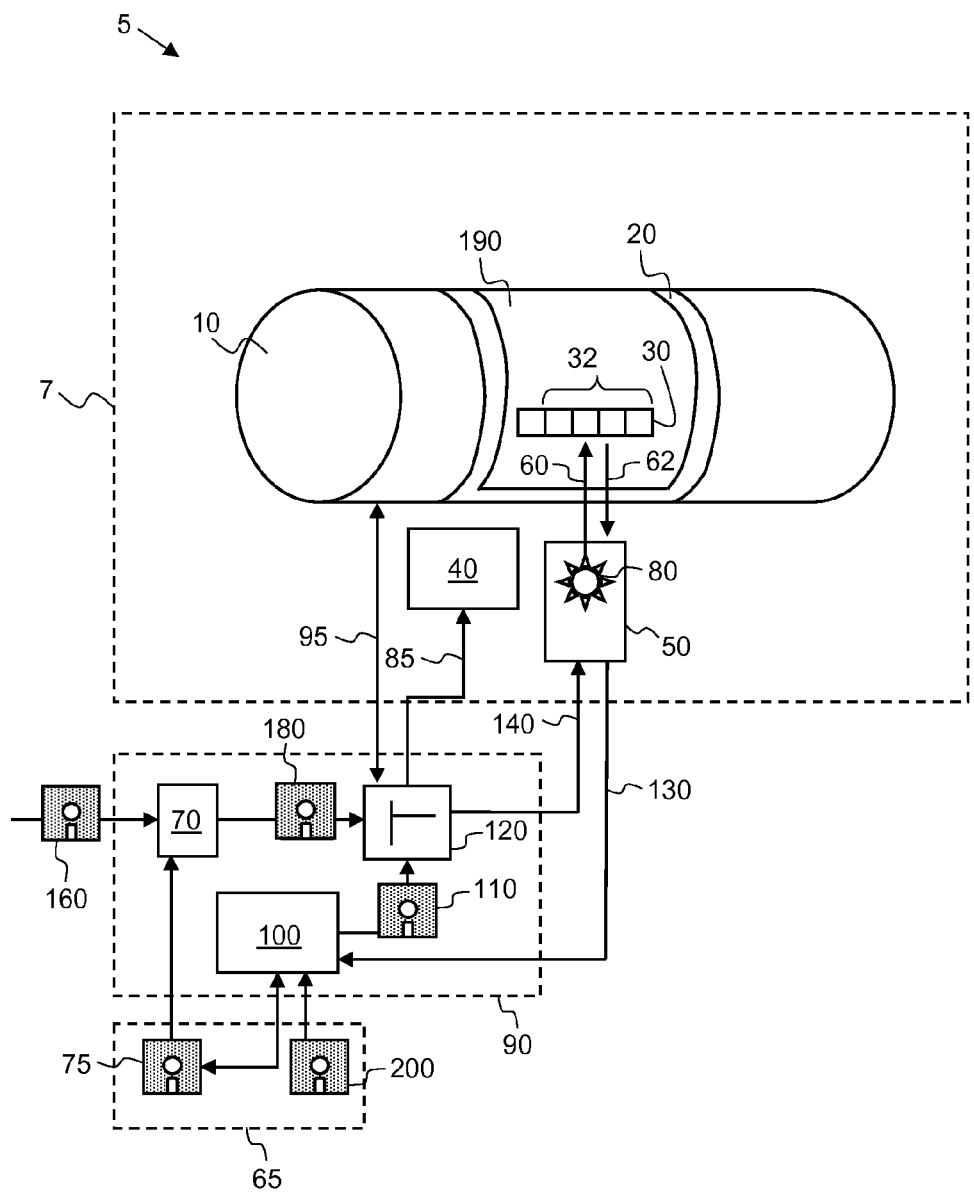
FIG. 1 shows a block diagram of a proofing system for adjusting a colorant mix comprising a plurality of colorants such that the adjusted colorant mix will produce a reference output color to within a predetermined tolerance. It is to be understood that the drawing is for purposes of illustrating the concepts of the invention and is not to scale.

Referring to FIG. 1, a printing system 5 for use in the method of the present invention is illustrated. Printing system 5 includes a printer 7 and a controller 90 that controls printer 7. Drum 10 is internal to printer 7. Drum 10 and a printhead 40 are controlled by controller 90 via drum control line 95 and printhead control line 85. A spectrophotometer 50, which contains an illumination source 80, is controlled by controller 90 via spectrophotometer control line 140. A substrate 20 is coupled to the drum 10. Drum 10 is preferably a printer drum; however, it may also be a platen or any other suitable type of printing support surface.

Spectrophotometer 50 is configured to illuminate colorant-combination patch 30 on substrate 20 with an incident light 60, measure reflected light 62, and assign a numerical color vector in output color space to the measured reflected light 62. Controller 90 is configured to receive the numerical color vector determined by the spectrophotometer 50 via output signal 130, whether analog, digital or the like.

In the following, the "output color" refers to the numerical color vector above and in common practice is (1) a vector with each component being the percent reflectance at a set of predefined light frequencies or (2) a vector of dimension 3 that is a standard tristimulous measure of color such as CIEXYZ or CIELAB, or (3) a vector in some other color space of p dimensions with p typically 3 or more.

In normal operation, image data 160, is sent to controller 90 of printing system 5, image data 160 comprising colorant data describing an image to be printed. Colorant correction subsystem 70 of controller 90 then modifies image data 160, using base point data 75 stored in database 65, into modified image data 180. Printer control subsystem 120 of controller 90 then directs printhead 40 via printhead control line 85 and drum 10 via drum control line 95 to deposit colorant on substrate 20. "Base point" data 75 comprises a set of actual digital-image colorant combinations associated with a set of nominal digital-image colorant combinations and a set of reference output colors for those pre-specified nominal digital-image colorant combinations. For example, the nominal digital-image colorant combination CMYK=[0,0.8,0.8,0] ("80% red")

might have associated actual "base point" digital-image colorant combination

CMYK=[0.013,0.808,0.788,0].

For the purposes of color calibration of printing system 5, calibration subsystem 100 generates color chart data 110, including base points of base point data 75 stored in database 65 and gradient points derived by the method of the present invention described below. Printer control subsystem 120 of controller 90 then directs printhead 40 via printhead control line 85 and drum 10 via drum control line 95 to deposit colorant on substrate 20 to thereby print document 190 comprising color chart 32 containing colorant-combination patch 30 (which is one of one or more colorant-combination patches that form color chart 32).

Printer control subsystem 120 then directs spectrophotometer 50 to measure colorant-combination patches 30 of color chart 32 to obtain output colors for the colorant-combination patches 30 in color chart 32, and sends spectrophotometer output signal 130, representing this color data, to calibration subsystem 100 of controller 90. Calibration subsystem 100 uses, by the method of the present invention, the colors of colorant-combination patches 30 to obtain local estimates of the gradients at the base points of the "colorant/color relationship" between the digital-image colorant combinations and the output colors. Color data obtained from the color chart 32 in this way is compared to reference output color data 200 stored in database 65, and calibration subsystem 100 determines, by the method of the present invention, adjusted base points of base point data 75, which, when printed, will produce more accurately the reference output colors of reference output color data 200.

While the system description and its use has been described in terms of a printing system 5, the method of the present invention can be applied to other image rendering systems, such as but not limited to display systems.

The present invention is a method for determining a change required in a selected base point in an input colorant space of a digital-image rendering system to obtain from the digital-image rendering system a desired reference output color to within a predetermined color tolerance. The required change is determined from a local approximation of the colorant/color relationship at the selected digital-image colorant combination. The term "local approximation of the colorant/color relationship at a selected base point" is used to describe a mathematical relationship between digital-image colorant combinations and output colors such that, if a digital-image colorant combination is proximate the selected base point, then the output color associated with that digital-image colorant combination via the local approximation is close to the measured color at the selected base point; more specifically, a "local approximation of the colorant/color relationship at a selected base point" is based on measurements of output colors at digital-image colorant combinations that are closer to the selected base point than any other base points are to the selected base point.

Figure 2:
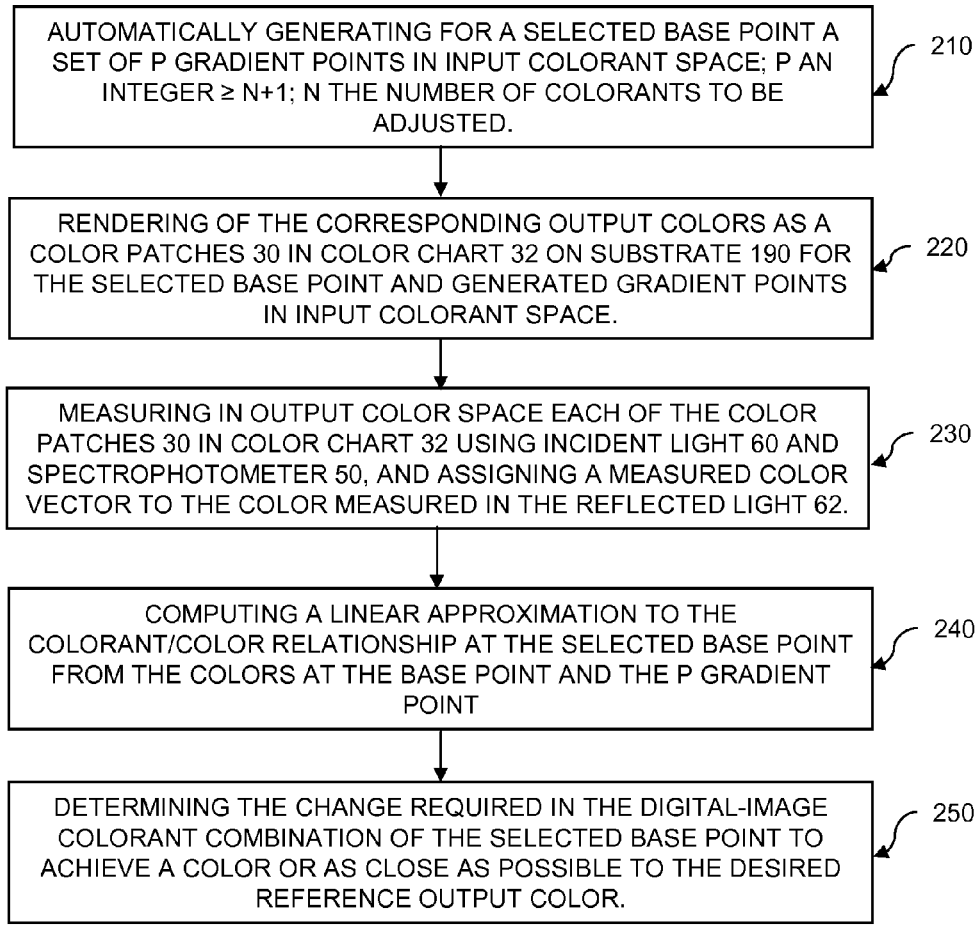
FIG. 2 shows a flow chart that describes a method for adjusting a colorant mix comprising a plurality of colorants such that the adjusted colorant mix will produce a reference output color to within a predetermined tolerance.

In a preferred embodiment, the local approximation is a linear approximation, obtained as described in the following. In a preferred embodiment, the method of the invention comprises, with reference to FIG. 2, selecting one of a given set of M base points in input colorant space, M being an integer greater than or equal to 1, and automatically generating 210 for each of the M base points a set of P distinct "gradient points" in input colorant space, the gradient points being (i) proximate or coincident with the particular base point and (ii) different from any of the other M−1 base points, and the set of P gradient points not lying in an affine subspace of dimension less than n, P being an integer equal to or greater than n+1, where n is the number of colorants to be adjusted. It is to be understood that, in some cases, a particular colorant may end up not requiring any adjustment. In general, P may differ from base point to base point.

It is to be understood that while the terms "input colorant," "input colorant space," and "input colorant combination" are employed in the present specification, the digital image rendering device can be any digital image rendering device, including but not limited to a printing system, a monitor, and a color display device. In the case of a color display device an input colorant combination can be specified, for example, in RGB color space, in which case N=3. In the case of a CMYK printer there are four colorants involved and N=4. In the case of a CMYKOV printer, with extra colorants orange and violet, there are six colorants involved and N=6. However, in a particular setting, such as with a digital-image colorant combination that only contains OMYK inks, one may wish to adjust only those 4 particular colorants, in which case the number of adjustable colorants is n=4. In the present specification the "amount" or "value" of any given colorant is taken to range from 0, corresponding to no colorant, to 1, corresponding to some upper physical limit of colorant. The set of all possible digital-image colorant combinations therefore constitutes a "unit colorant hypercube" in N-dimensional input colorant space.

The mathematical "gradient" of the function that relates digital-image colorant combination to output color is an n x p matrix with n rates of change (partial derivatives) for each of the p color components in output color space. As will be understood by any practitioner in the field, any set of P gradient points would be sufficient to approximate the gradient at the base point.

In a preferred embodiment of the present invention the gradient points are obtained as follows. Let x denote a digital-image colorant combination (with $x_j$ the value of the $j^{th}$ colorant) and choose a "step size" s (e.g. 5%) with the objective of estimating a rate of change by measuring two digital-image colorant combinations that differ by s. First an "anchor" gradient point $x_0$ is defined that is displaced from x in the direction towards the nearest digital-image colorant combination that has all colorants at one of their respective limits, as follows. Let n' denote the number of colorants $x_j$ which are at neither their lower limit (0) nor upper limit (1).

If $x_j$<0.5, then set $x_{0j}$=max(0, $x_j$−s/(n'+1)).

If $x_j$≥0.5, then set $x_{0j}$=min(1, $x_j$+s/(n'+1)).

Then n more gradient points are defined by adding or subtracting s from each colorant of $x_0$ in turn, adding if the colorant is less than 0.5, and subtracting if greater than 0.5.

Provided that in subtracting or adding s/(n'+1) from the coordinates of x to obtain $x_0$ the result did not fall below 0 or above 1 for any of the colorants, then the mean/centroid of the set of $x_0$ and the set of gradient points is x, so this is a reasonable estimate of the gradient at x.

The method further comprises rendering 220 the selected base point and each of the gradient points associated with the selected base point as colorant-combination patches 30 on document 190 in FIG. 1. Although the method applies to a single base point, the method in practice may be applied to multiple base points simultaneously, thereby rendering color chart 32 comprising a plurality of colorant-combination patches 30 representing the output colors associated with all the base points in input colorant space and with the collection of automatically generated gradient points in input colorant space, the latter being all the gradient points of all the base points.

The method comprises the measuring 230 of output colors in output color space of each of the colorant-combination patches 30 in color chart 32 using incident light 60 and spectrophotometer 50, which measures reflected light 62, assigning in the process a numerical color vector to the color measured in the reflected light 62.

The method comprises the computing 240 of a linear approximation to the colorant/color relationship at the selected base point by fitting a linear relationship to the colors at the gradient points, and then using the gradient of this linear relationship to construct a modified linear relationship that has the same gradient but takes the color of the base point at the base point. In the case where P=n+1 and the gradient points are described as above, the computation of the gradient of this linear relationship is straightforward, as follows. Because each additional gradient point differs from anchor point $x_0$ in only one coordinate, the rate of change with respect to that colorant is easily computed by taking the color difference and dividing by s. For each color component, the set of rates of change with respect to each colorant constitutes a column vector which is the mathematical gradient of the function relating the digital-image colorant combination to that color component. The set of gradient vectors, with one vector per color component, can therefore be represented as a n×p "gradient matrix" $G_x$, and the change in color $\Delta c$ (a row vector) relative to the color c of the base point x is related approximately to the change $\Delta x$ (a row vector) in the digital-image colorant combination by the relation $\Delta c = \Delta x \, G_x$, where the right hand side of the equation indicates a matrix multiplication. The set of all colors attainable via the local approximation is therefore given by $c + \Delta x \, G_x$ where $x + \Delta x$ is within the unit colorant hypercube.

More generally, in the case where P>n+1 or gradient points are selected differently, then in a preferred embodiment the linear relationship is fitted using standard procedures such as is described by, but not limited to, the method using two sets of gradient points below.

The method further comprises determining 250 the change in the digital-image colorant combination of the base point to achieve the desired reference output color or a color as close as possible to the reference output color. If the difference between the reference output color for the selected base point and the current measured color of the base point is denoted by $\Delta c$, then what is required is to find a change to the digital-image colorant combination $\Delta x$ such that $$\Delta x G_x = \Delta c.$$

On the surface this seems a simple linear system of equations, but
(i) it may not have a solution,
(ii) any solution may not be unique because $\Delta x$ involves n>p unknowns and $\Delta c$ only p, and
(iii) only solutions such that $x+\Delta x$ is within the n-dimensional unit colorant hypercube are valid.

In the case that there is no solution, one can determine the $\Delta x$ that minimizes the weighted least squares distance $(\Delta x\, G_x - \Delta c)\, W\, (\Delta x\, G_x - \Delta c)^T$, where W is a positive-definite symmetric matrix of weights that reflect the (square of the) relative visual sensitivity of the human eye to the different color components of the reference output color $c_0$ at the base point, and $\Delta c = c - c_0$. If this $\Delta x$ is not unique, one can determine the one that is smallest in length (i.e., requires as small a shift in colorants as possible). More precisely, W can be chosen so that $(\Delta x\, G_x - \Delta c)\, W\, (\Delta x\, G_x - \Delta c)^T$ is a quadratic approximation of the square of some standard color difference between $c + \Delta x\, G_x$ and the reference output color $c_0$ for the base point, in which case W is proportional to the Hessian matrix of derivatives of the squared color difference. For example, if the output color space is CIELAB and the color difference is CIE94, then $$W = [(1/k_L S_L)^2 0 0][0(a/(k_C S_C C))^2 + (b/(k_H S_H C))^2((1/k_C S_C)^2 - (1/k_H S_H)^2)(ab/C^2)][0((1/k_C S_C)^2 - (1/k_H S_H)^2)(ab/C^2)(a/(k_H S_H C))^2 + (b/(k_C S_C C))^2]$$

where a and b denote the CIELAB components a* and b* of $c_0$, C denotes the CIELAB chroma of $c_0$, and $k_L$, $k_C$, $k_H$, $S_L$, $S_C$, and $S_H$ are the weighting and scale factors in the definition of CIE94.

For the purpose of describing some computational procedures below, define the matrix operator '/' such that B/A denotes the matrix X that satisfies the linear system XA=B, where A is a square nonsingular matrix, and define the matrix operator '\' such that A\B denotes the matrix X that satisfies the linear system AX=B. In practice these operations are computed by Gaussian elimination or another standard linear-system solution technique.

Before describing further how to compute $\Delta x$, however, note that if for given x and $\Delta c$ there is no $\Delta x$ such that $\Delta c = \Delta x\, G_x$, such as when n<p, then in regions of the input colorant space where the relationship between the digital-image colorant combinations and the output color is significantly non-linear, the estimate of $G_x$ above may yield poor convergence of the digital-image colorant combination adjustments with iterative applications of this technique. Ideally what is desired is the gradient $G_{x+\Delta x}$ at $x+\Delta x$ for a $\Delta x$ for which $\Delta x\, G_{x+\Delta x}$ is closest to $\Delta c$. In this case, in a preferred embodiment, one may use two successive sets of gradient points, as follows. If $\Delta X$ denotes a $2(n+1) \times n$ matrix in which each row is a gradient point relative to some base point, $\Delta C$ denotes a $2(n+1) \times p$ matrix in which each row is the change in color from the color of the base point, and W denotes a $2(n+1) \times 2(n+1)$ diagonal matrix of weights associated with the $2(n+1)$ rows of $\Delta X$ & $\Delta C$, then the weighted least-squares estimate of the gradient $G_{x+\Delta x}$ is obtained via $$G_{x+\Delta x} = (\Delta X^T W \Delta X) \backslash (\Delta X^T W \Delta C).$$

For the common case of a trichromatic output color space where p=3, the number of adjustable inks on the gamut boundary is at most 2, and the matrices above are at most 2×2 and can be solved explicitly, i.e., without recourse to linear algebra software. One reasonable choice of the diagonal elements $W_{ii}$ is $1/\Delta E_i^2$ where $\Delta E_i$ is the difference in color (using any color difference measure) between the color of the $i^{th}$ inking and the target color.

If $n \geq p$ and the columns of $G_x$ are linearly independent (i.e., a change in color along any given line in output color space is possible, even if small), then the equation $\Delta x\, G_x = \Delta c$ has a solution, and if n>p it has multiple solutions, in which case it is desirable to find the smallest colorant change $\Delta x$ that achieves the desired color. This is obtained via $$\Delta x = \Delta c (G_x / G_x^T G_x))^T.$$

If $n \geq p$ and the columns of $G_x$ are linearly dependent, a rare case, then in general there is no exact solution, so one can compute $\Delta x$ that minimizes the weighted least squares distance $(\Delta x\, G_x - \Delta c)\, W\, (\Delta x\, G_x - \Delta c)^T$ as already described above. Let $G_{x0}$ denote a basis for the row space of $G_x$. The $\Delta x$ is obtained via $$\Delta x = [\Delta c\, W G_{x0}^T / (G_{x0} W G_x^T G_x W G_{x0}^T)] G_x W G_{x0}^T.$$

If n<p, then $\Delta x\, G_x = \Delta c$ again in general does not have a solution, in which case it is desirable to find $\Delta x$ that minimizes the weighted least squares distance $(\Delta x\, G_x - \Delta c)\, W\, (\Delta x$ $G_x - \Delta_c)^T$ as already described above. If the rows of $G_x$ are linearly independent then this $\Delta x$ is unique and is obtained via $$\Delta x = \Delta c \, WG_x^T/(G_x WG_x^T).$$

If $n < p$ but the rows of $G_x$ are linearly dependent, also a rare case, then the $\Delta x$ that minimizes $(\Delta x \, G_x - \Delta c) \, W \, (\Delta x \, G_x - \Delta c)^T$ is not unique, so it is desirable to find the smallest colorant change $\Delta x$ that minimizes $(\Delta x \, G_x - \Delta c) \, W \, (\Delta x \, G_x - \Delta c)^T$. Again, let $G_{x0}$ denote a basis for the row space of $G_x$. Then the smallest $\Delta x$ that minimizes $(\Delta x \, G_x - \Delta c) \, W \, (\Delta x \, G_x - \Delta c)^T$ is obtained via $$\Delta x = [\Delta c \, WG_{x0}^T/(G_{x0} WG_x^T G_x WG_{x0}^T)] G_x WG_{x0}^T,$$

(the same equation as for the case above with $n \geq p$ and the columns of $G_x$ linearly dependent).

In all of the cases above, if $x + \Delta x$ is within the unit colorant hypercube, the present invention have the best solution.

Before considering what to do if $x + \Delta x$ is not within the unit colorant hypercube, however, note that if $\Delta x$ is much larger than the step size $s$ used to approximate the gradient, then the linear function based on the gradient may not approximate the true color function well at the solution. It is therefore advisable to constrain $\Delta x$ so that it does not extrapolate too far beyond the simplex of digital-image colorant combinations used to compute the gradient. In one embodiment of the present invention, one can use a limit of $s$ below the lowest value or $s$ above the highest value of each coordinate of the digital-image colorant combinations used to approximate the gradient. More precisely, one can set the lower limit to $$L_j = \max(0, x_{0j} - s)$$

and the upper limit to $$U_j = \min(1, x_{0j} + s)$$

(Such a digital-image colorant combination could be as much as $s\sqrt{n}$ away from the anchor point $x_0$.) With this approach the solution is constrained to a reduced colorant hypercube that is smaller than the unit colorant hypercube.

If $x + \Delta x$ is outside this reduced colorant hypercube, one must consider solutions with various colorants fixed so that the corresponding coordinate of $x + \Delta x$ is $L_j$ or $U_j$ and the remainder coordinates vary, and then select the best solution within those constraints. This could be formulated as a linear programming problem, but solving it as such would add considerable programming complexity. Instead, consider solving all possible problems in which the coordinates are fixed or free, and select $\Delta x$ that minimizes the weighted distance of $\Delta x \, G_x$ from $\Delta c$ over all solutions for which $x + \Delta x$ is within the reduced colorant hypercube. In theory each coordinate of $x + \Delta x$ could be fixed at $L_j$, be fixed at $U_j$, or vary, for a total of $3^n$ possible equations to solve. However, it is reasonable to expect that if a coordinate of $x$ is near the boundary of the reduced colorant hypercube, then only the problem that fixes that coordinate at that boundary, rather than the opposite boundary, will likely have a viable solution. This limits the number of problems to $2^n$. For example, if n is the typical number 4, then this gives rise to only 16 problems to solve. Note that fixing all coordinates of $x + \Delta x$ to the boundary of the reduced colorant hypercube nearest x provides a solution, but in all but a very few cases there will be a better one.

To find a particular solution, let the subscripts L, U, and '−' denote the subvectors/submatrices for which the elements/rows are to be fixed at their lower limits, fixed at their upper limits, or allowed to vary, respectively. Let m denote the number of colorants in $\Delta x$ allowed to vary. Fixing $x_L$ at its lower limits implies fixing $\Delta x_L$ at $x_L - x_0$ and fixing $x_U$ at its upper limits implies fixing $\Delta x_U$ at $x_U - x_0$. So $$\Delta x \, G_x = \Delta x_- G_{x-} + (x_0 - x_L) G_{xL} + (x_U - x_0) G_{xU}$$

and one wishes to find $\Delta x$ such that $\Delta x \, G_x$ is as close as possible to $\Delta c$. More precisely, one wishes to find $\Delta x$ that minimizes the weighted squared difference $$(\Delta x_- G_{x-} - \Delta c_-) W (\Delta x_- G_{x-} - \Delta c_-),$$

where $$\Delta c_- = \Delta c - (x_0 - x_L) G_{xL} - (x_U - x_0) G_{xU},$$

and if this $\Delta x$ is not unique, then the one that is smallest. This is obtained via the appropriate cases of the unconstrained equations above with $G_x$ and $\Delta c$ replaced by $G_{x-}$ and $\Delta c_-$, respectively, depending on whether $m \geq p$ or $m < p$, and whether $G_{x-}$ is of full rank or not.

The present invention can be applied as a single step adjustment to correct the color of a base point, or set of base points, or multiple times in an iterative implementation. The application of the presented method multiple times is beneficial in regions where the current color and target color are significantly different and the relationship between the digital-image colorant combinations and the color is significantly non-linear. The re-sampling of the local color space for each iteration allows accurate corrections in the non-linear regions with the ability to adjust the distance between the gradient points from their base points M.

The present invention thus presents a new method to adjust a digital-image colorant combination. In the prior art extensive color models have been used to predict adjustments needed to correct specific colors or color spaces. Typical prior art application examples are profile optimizations, printer calibration, or spot color prediction. Instead of collecting extensive color data by coarsely sampling a color space, such as the use of ECI or IT8 targets, the proposed method samples only a limited set of base digital-image colorant-combinations to be adjusted, together with some gradient patches, being additional digital-image colorant-combinations employed in determining local estimates of the gradients. Local estimates of color gradients are then computed allowing an accurate prediction of the digital-image colorant combination adjustment for the base point to produce a specific target color.

An important aspect of the present invention is the sampling of the current local color behavior around a specific base point. Prior-art methods typically rely on color space models generated at an earlier point in time, on a different physical image output device or sampling the color space coarsely which provides insufficient information of the current local color behavior. The approach to adjusting color described in the present invention can be applied iteratively. The image containing the base points and gradient points can be updated in the digital image after every adjustment of the base point for the next iteration to ensure improved color match to the target color with subsequent iterations.

Appropriate care needs to be taken to constrain the gradient point as well as the computed gradient adjustment to account for non-linearity in the relationship between output color and input digital-image colorant combination, and color repeatability on the imaging device. In a preferred embodiment the color chart layout is optimized to achieve optimum consistency when imaging and measuring the base and gradient points.

In a preferred embodiment the number of gradient patches is reduced by storing pre-computed local estimates of the gradients where the relationship between output color and input digital-image colorant combination is comparatively linear and reasonably stable over time and across devices.

The approach of using local estimates of gradients described in the present invention can also be employed to determine the optimum gray balance digital-image colorant combinations to achieve a consistent hue along the neutral gray axis.

An additional preferred embodiment of the present invention is utilized for achieving specific target colors such as solid spot colors or spot tints.

In a preferred embodiment the adjustment of the base points for out-of-gamut colors can be optimized based on user selectable criteria, such as but not limited to minimum CIE $\Delta E_{ab}$, $\Delta E_{94}$, or $\Delta E_{00}$ color difference measures.

In a preferred embodiment, this method automatically renders the base and neighboring digital-image colorant combination patches on an image output device, followed by automatically measuring the color of these patches, and adjusting the base points. This process can be automatically repeated based on a specified tolerance or user choice to create an excellent match between the final measured color and the target color of the base patches.

In order to reduce the effect of system noise such as print-to-print variability, patches of colors that are proximate another in input colorant space are therefore printed in mutually spatially proximate patches on document 190.

In a preferred embodiment, the base points are changed only if the measured output color of the changed base point is closer to the corresponding reference output color associated with the base point in reference output color data 200. If the measured output color is farther from the reference output color, then the existing base point is retained.

The present invention has significant advantages compared to the prior art where the relationship between output color and input digital-image colorant combination is significantly non-linear. The present invention can be utilized across a large number of applications including but not limited to inkjet printer calibration, digital press calibration, monitor calibration, profile optimizations for particular colorants, spot color optimization and spot tint optimization.

The invention has been described in detail with particular reference to certain preferred embodiments thereof, but it will be understood that variations and modifications can be effected within the scope of the invention.

PARTS LIST

5 printing system
7 printer
10 drum
20 substrate
30 colorant-combination patch
32 color chart
40 printhead
50 spectrophotometer
60 incident light
62 reflected light
65 database
70 colorant correction subsystem
75 base point data
80 illumination source
85 printhead control line
90 controller
95 drum control line
100 calibration subsystem
110 color chart data
120 printer control subsystem
130 spectrophotometer output signal
140 spectrophotometer control line
160 image data
180 modified image data
190 document
200 reference output color data
210 automatically generating for a selected base point a set of P gradient points in input colorant space
220 rendering of the corresponding output colors as a color patches in color chart on substrate
230 measuring in output color space each of the color patches in color chart using incident light and spectrophotometer
240 computing a linear approximation to the colorant/color relationship at the selected base point from the colors at the base point and the P gradient points
250 determining the change required in the digital-image colorant combination of the selected base point

The invention claimed is:

1. A method for reproducing an image, the method comprising:
    determining a change required in a selected base point in an input colorant space of a digital-image rendering system to obtain from the digital-image rendering system a desired reference output color to within a predetermined color tolerance, wherein the determination of the change is based on a local approximation of a colorant/color relationship at the selected base point; and
    reproducing the image on the rendering system by changing selected colorant combinations of the image based on the result of determining the change required in a selected base point, wherein the determination of the change based on a local approximation comprises:
    a) the selecting of a selected color attainable via the local approximation that is proximate to the color obtainable via the local approximation that is closest to the desired reference output color with respect to some measure of color difference; and
    b) the selecting of, out of all changes to the selected base point that lie within a unit colorant hypercube of digital-image colorant combinations and that produce the selected color, a change that is close to the change that is smallest out of all changes to the selected base point that lie within a unit colorant hypercube of digital-image colorant combinations and that produce the selected color with respect to some measure of magnitude.

2. The method of claim 1, wherein the local approximation is a linear approximation.

3. The method of claim 2, wherein a gradient of the linear approximation is obtained by:
    measuring output colors from the digital image rendering system at P gradient points, wherein P is an integer $\geq n+1$ and n is a number of colorants to be adjusted; and
    fitting a linear relationship to the gradient points and corresponding output colors.

4. The method of claim 3, comprising automatically generating the P gradient points.

5. The method of claim 3, wherein the gradient points are:
    proximate or coincident with the selected base point; and
    different from any other base point than the selected base point.

6. The method of claim 3, wherein the gradient of the linear approximation is stored in a database.

7. The method of claim 2, wherein a gradient of the linear approximation is retrieved from a database containing pre-computed gradients.

8. A computerized color calibration system for determining a change required in a selected base point in an input colorant space of a digital-image rendering system to obtain from the digital-image rendering system a desired reference output color to within a predetermined color tolerance, the color calibration system configured for determining the change based on a local approximation of a colorant/color relationship at the selected base point, wherein the determination of the change based on a local approximation comprises:
- a) the selecting of a selected color attainable via the local approximation that is proximate to the color obtainable via the local approximation that is closest to the desired reference output color with respect to some measure of color difference; and
- b) the selecting of, out of all changes to the selected base point that lie within a unit colorant hypercube of digital-image colorant combinations and that produce the selected color, a change that is close to the change that is smallest out of all changes to the selected base point that lie within a unit colorant hypercube of digital-image colorant combinations and that produce the selected color with respect to some measure of magnitude.

9. The color calibration system of claim 8, wherein the local approximation is a linear approximation.

10. The color calibration system of claim 9, configured for obtaining a gradient of the linear approximation by:
measuring output colors from the digital image rendering system at P gradient points, wherein P an integer $\geq n+1$ and n is a number of colorants to be adjusted; and
fitting a linear relationship to the gradient points and corresponding output colors.

11. The color calibration system of claim 10, configured for automatically generating the P gradient points.

12. The color calibration system of claim 10, wherein the gradient points are:
proximate or coincident with selected base point; and
different from any other base point than the selected base point.

13. The color calibration system of claim 9, comprising a database containing pre-computed gradients and the system configured for retrieving the gradient of the linear approximation from the database containing pre-computed gradients.

14. The color calibration system of claim 9, comprising a database and the system is configured for storing a gradient of the linear approximation in the database.

* * * * *